(12) United States Patent
Ogawa

(10) Patent No.: US 7,199,800 B2
(45) Date of Patent: Apr. 3, 2007

(54) UNIT AND PROGRAM FOR DISPLAYING MAP

(75) Inventor: Tsuyoshi Ogawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/636,563

(22) Filed: Aug. 8, 2003

(65) Prior Publication Data
US 2004/0066316 A1 Apr. 8, 2004

(30) Foreign Application Priority Data
Aug. 9, 2002 (JP) ............................. 2002-232830
Aug. 9, 2002 (JP) ............................. 2002-232831

(51) Int. Cl.
*G06F 13/00* (2006.01)
*G06T 9/00* (2006.01)

(52) U.S. Cl. ..................... 345/537; 345/555; 345/536

(58) Field of Classification Search ................ 345/501, 345/555, 536, 537; 340/988, 990, 995.1, 340/995.11–995.26
See application file for complete search history.

(56) References Cited

U.S. PATENT DOCUMENTS 6,434,479 B1 * 8/2002 Kondou et al. ............. 701/203
6,804,394 B1 * 10/2004 Hsu ........................... 382/173

2001/0037305 A1 * 11/2001 Mochizuki ................... 705/52

FOREIGN PATENT DOCUMENTS

| JP | A 5-18767 | 1/1993 |
|---|---|---|
| JP | A-10-301488 | 11/1998 |
| JP | A-11-203308 | 7/1999 |
| JP | A-2000-148126 | 5/2000 |
| JP | A 2000-275050 | 10/2000 |
| JP | A 2000-283784 | 10/2000 |
| JP | A 2001-195052 | 7/2001 |
| JP | A-2001-241965 | 9/2001 |

* cited by examiner

*Primary Examiner*—Kee M. Tung
*Assistant Examiner*—Hau Nguyen
(74) *Attorney, Agent, or Firm*—Oliff & Berridge, PLC

(57) ABSTRACT

The invention provides a map display unit including a first memory for storing map data and a drawing memory for drawing the map data and displaying display-area data and a display. The map display unit includes a unit to read and decompress compressed map data stored in blocks in a data storage medium and to store the decompressed map data in the first memory; a unit to draw the stored map data in the drawing memory; and a unit to determine the display area and to display the display-area data of the drawing area in the drawing memory on the display. When there is no display-area data in the first memory, compressed map data is read and decompressed from the data storage medium by the data decompression unit. The map display unit further includes an environmental change sensor and controllers to vary the color tone of the map data with the environmental change, thereby displaying easily viewable map data.

5 Claims, 12 Drawing Sheets

CHANGING COLOR DEPENDING ON DATE

| TABLE | SEMI-TRANSPARENT COLOR |
|---|---|
| 01 | SPRING (PINK) |
| 02 | SUMMER (BLUE) |
| 03 | AUTUMN (YELLOW) |
| 04 | WINTER (WHITE) |

CHANGING COLOR DEPENDING ON TIME

| TABLE | SEMI-TRANSPARENT COLOR |
|---|---|
| 01 | EVENING (RED) |
| 02 | NIGHT (BLACK) |

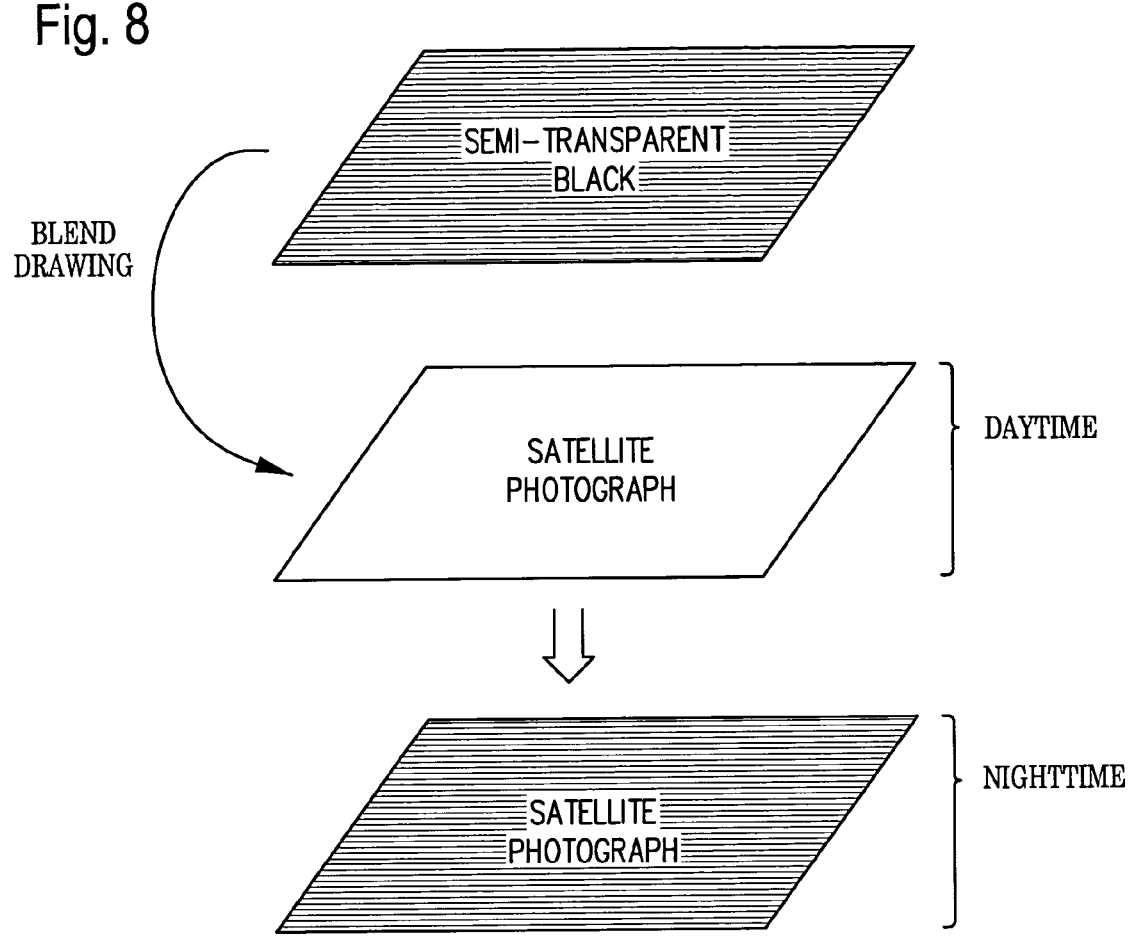

UNIT AND PROGRAM FOR DISPLAYING MAP

The disclosure of Japanese Patent Application No. 2002-232831 filed on Aug. 9, 2002 and No. 2002-232830 filed on Aug. 9, 2002 including the specification, drawings and abstract are incorporated herein by reference in their entirety.

BACKGROUND OF THE INVENTION

1. Field of Invention

The invention relates to a unit and a program for displaying a map, the unit including a first memory for storing map data and a drawing memory for drawing the map data and displaying display-area data of a drawing area in the drawing memory on a display while editing the map in accordance with selected edit information.

2. Description of Related Art

In navigation systems, a map scroll operation is performed on a screen to display a simulation route from the current location to a destination on a map screen in sequence, to track-display the current location with the actual traveling, and to set a starting point, a destination, and a detour on the map.

For example, there have been proposed navigation systems in which, when a map is scrolled with the current location and a route displayed thereon, a determination frame is placed inside a display area and the scrolling is controlled depending on whether a target point is present, thereby eliminating useless scroll operations (JP Publication No. 2000-275050, paras [0011], [0055] and [0056], FIGS. 4–6).

Various data and various data constructions are used to display a map in navigation systems. One of the data used for map display is satellite photograph data. Because the satellite photograph data is large in size, it is generally compressed (by Joint Photographic Experts Group method: JPEG, etc.) when stored in a map disc (storage medium). The compressed data must be decompressed before such satellite photograph data is displayed.

The process for decompressing JPEG compressed data with high compressibility takes a lot of time, thus posing the problem of too low follow-up capability to catch up the display when the current location is tracked and scrolled using the satellite photograph data displayed by a car navigation system.

Various propositions have been put forth (JP Publications Nos. 5-018767, paras [0022]–[0026], FIG. 6 and 2000-283784, para [0025]) regarding map displays in the car navigation systems, one of which is a system of displaying a route guide map on a display screen such that the luminosity of the display screen and a color palette is changed with time so as to prevent the display from becoming hard to view with a change in day-to-night ambient luminosity. However, it takes a lot of processing time to change colors using the color palette, thus having the problem of taking a long time particularly when the number of colors to be changed is large.

Another proposition has described a system in which two kinds of satellite photograph data for daytime and nighttime are stored in a storage medium and data is switched from daytime satellite photograph data to nighttime satellite photograph data in synchronization with a car lighting switch. The system, however, has the problem of requiring a storage medium for storing two pieces of satellite photograph data on the same location thereby increasing the cost of the entire system.

SUMMARY OF THE INVENTION

The invention has been made to address the above problems. Accordingly, an object of the invention is to allow smooth scrolling of a map display using compressed data without delay in the display.

Another object of the invention is to allow an easily viewable display responding to differences in the environment using one piece of image data and to allow editing of various display images.

To this end, according to the invention, there is provided a map display unit including a first memory for storing map data and a drawing memory for drawing the map data and displaying display-area data of a drawing area in the drawing memory on a display. The map display unit includes a device to read and decompress compressed map data stored in a data storage medium and to store the decompressed map data in the first memory; a device to draw the map data stored in the first memory in the drawing memory; and a device to determine the display area and to display the data on the display area of the drawing area in the drawing memory on the display; wherein, when there is no display-area data in the first memory, compressed map data including the display area is read out and decompressed from the data storage medium by the device to read and decompress map data.

According to an embodiment of the invention, the compressed map data is raster data divided into blocks and having positional information for each block.

According to an embodiment of the invention, when there is no display-area data in the first memory, the compressed map data including the display area, which is read out from the data storage medium, is compressed map data obtained on the basis of the positional information of the compressed map data and the coordinates of the display area.

Further, according to the invention, there is provided a map display unit including a first memory for storing map data and a drawing memory for drawing the map data and displaying display-area data of a drawing area in the drawing memory on a display. The map display unit includes a device to read and decompress compressed map data stored in a data storage medium and to store the decompressed map data in the first memory; a device to draw the map data stored in the first memory in the drawing memory; and a device to determine the display area and display the data on the display area of the drawing area in the drawing memory on the display; wherein, when there is no display-area data in the drawing area of the drawing memory, map data on the display area is read out from the first memory and is drawn in the drawing memory by the device to draw the map data.

Additionally, according to the invention, there is provided a map display unit including a first memory for storing map data and a drawing memory for drawing the map data and displaying display-area data of a drawing area in the drawing memory on a display. The map display unit includes a device to select and read out compressed map data and uncompressed map data from a data storage medium; a device to decompress the compressed map data read out by the data-reading device and to store the decompressed map data in the first memory; a device to draw either of the uncompressed map data read out by the data-reading device or the map data stored in the first memory in the drawing memory; a device to determine the display area and display the data on the display area of the drawing area in the drawing memory on the display; and a device to switch a map to be displayed; wherein the map selecting device switches which of the uncompressed map data or the map data the drawing device draws in the drawing memory.

According to an embodiment of the invention, the map selecting device includes a device to determine the velocity of a vehicle and switches the map to be displayed depending on whether the velocity has exceeded a threshold.

According to an embodiment of the invention, the compressed map data is raster data and the uncompressed map data is vector data.

According to an embodiment of the invention, the raster data is satellite photograph data.

According to an embodiment of the invention, the device to decompress the map data manages the use history of the map data stored in the first memory, erases the map data in early order, and stores the decompressed map data in the first memory.

Also, according to the invention, there is provided a map display program including the steps of reading and decompressing compressed map data stored in a data storage medium; storing the decompressed map data in a first memory; drawing the map data stored in the first memory in a drawing memory; and determining a display area and displaying data on the display area of a drawing area in the drawing memory on a display. When there is no display-area data in the first memory in the step of displaying the data on the display, the compressed map data including the display area is read out and decompressed from the data storage medium in the step of reading and decompressing the compressed map data.

Further, according to the invention, there is provided a map display unit including a storage device to store raster map data; a sensing device to sense a change in the environment; a control device to change the color tone of the raster map data depending on the change in the environment sensed by the environmental-change sensing device; and a display device to display the map data changed by the control device.

According to an embodiment of the invention, the map data is divided into blocks and each of the divided raster data has positional information on a representative point.

According to an embodiment of the invention, the sensing device senses the change in the environment on the basis of the information of the global positioning system (GPS).

According to an embodiment of the invention, the sensing device determines whether the time is day or night depending on whether a vehicle light is lit.

According to an embodiment of the invention, the sensing device determines the current season on the basis of GPS information.

According to an embodiment of the invention, the control device changes the RGB value of the map data on the basis of predetermined color information and transmittance information.

According to an embodiment of the invention, the storage device further includes vector map data and current-location-mark information, and wherein the control device overwrites vector map data on a destination guidance route on the raster map data whose color tone has been changed.

According to an embodiment of the invention, the control device changes the color tone of the raster map data when the map data is drawn in the drawing memory.

According to an embodiment of the invention, the control means changes the color tone of the raster map data drawn in the drawing memory when the map data is outputted to the display device.

And, according to the invention, there is provided a map display program for displaying a map on the basis of raster map data stored in storage device and a change in the environment sensed by a sensing device for sensing a change in the environment. The map display program includes the steps of sensing a change in the environment by the sensing device; changing the color tone of the raster map data depending on the change in the environment sensed in the step of sensing the change in the environment; and displaying the map data changed in the step of changing the color tone.

BRIEF DESCRIPTION OF THE DRAWINGS

The invention will be described hereinafter with reference to the drawings in which:

FIG. 8 is an explanatory diagram of an example of the process of converting a day-image satellite photograph to a night image;

DETAILED DESCRIPTION OF PREFERRED EMBODIMENTS

Figure 1:
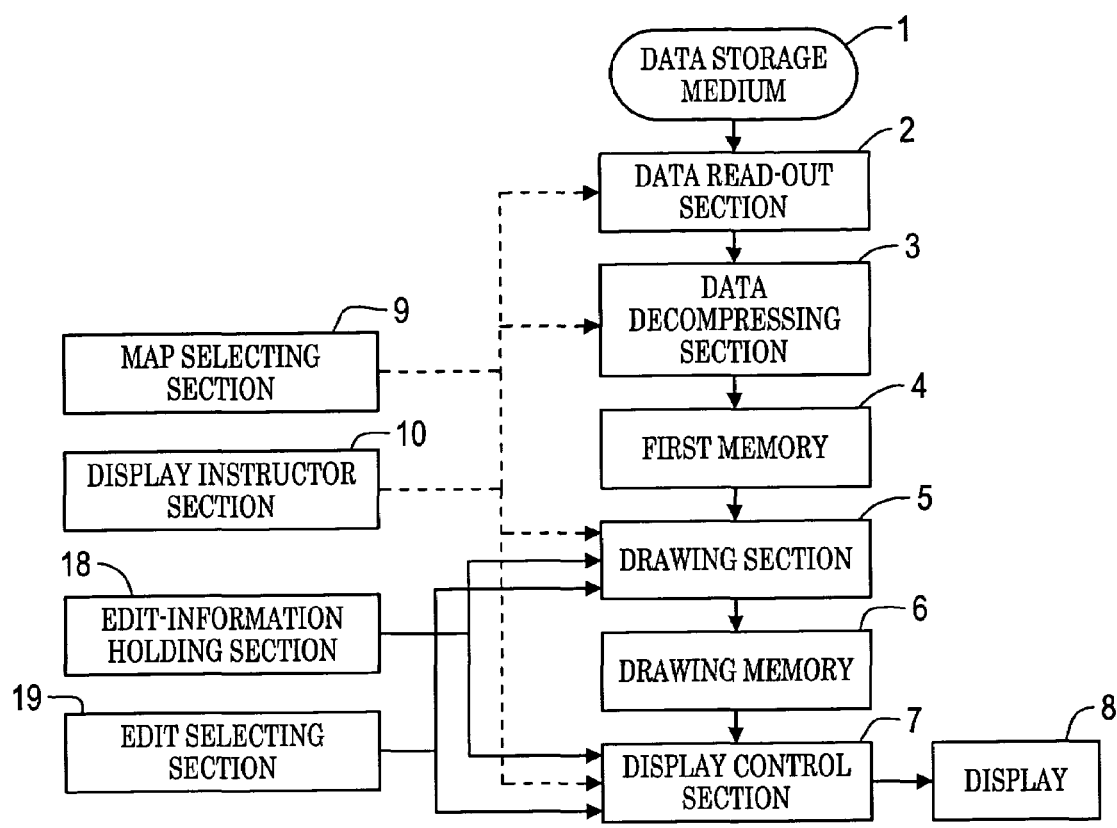
FIG. 1 is an explanatory diagram of a map display unit according to an embodiment of the invention.

In the drawings, reference numeral 1 denotes a data storage medium; numeral 2 denotes a data read-out section; numeral 3 denotes a data decompressing section; numeral 4 denotes a first memory; numeral 5 denotes a drawing section; numeral 6 denotes a drawing memory; numeral 7 denotes a display control section; numeral 8 denotes a display; numeral 9 denotes a map selecting section; numeral 10 denotes a display instructor section; numeral 18 denotes an edit-information holding section; and numeral 19 denotes an edit selecting section.

Referring to FIG. 1, the data storage medium 1 stores map data to be displayed. The data storage medium 1, for purposes of description, is, but is not limited to, a disc (external storage medium) for storing various map data including compressed map data, such as JPEG satellite photograph data with high compressibility, and uncompressed map data. Other ways of providing stored map data to the system would be known to those skilled in the art. The data read-out section 2 selects and reads out compressed map data or uncompressed map data from the data storage medium 1. The data decompressing section 3 reads out the compressed map data stored in the data storage medium 1, decompresses it, and stores the decompressed map data in the first memory 4. On the other hand, for the uncompressed map data, the data decompressing section 3 stores it unchanged in the first memory 4.

The first memory 4 holds a certain range of map data including the display area of the display 8 in order to display a map on the screen of the display 8 and to allow smooth scrolling without delay. This is, for example, a dynamic random access memory (DRAM), which stores the uncompressed map data read out from the data storage medium 1 by the data read-out section 2 and the compressed map data decompressed by the data decompressing section 3.

The drawing memory 6 draws an image to be displayed on the display 8. This is, for example, a video random access memory (VRAM), which is substantially the same as or larger than the display area of the display 8. The drawing section 5 draws the map data stored in the first memory 4 into the drawing memory 6. The display control section 7 determines the display area and lets the data for the display area of the drawing area in the drawing memory 6 be displayed in the display 8.

The display instructor section 10 indicates the scaling, the position, the area, and the scrolling of the map to be displayed on the display 8. This includes, for example, a remote control, a joystick, an audio input, and/or other pointing devices. The map selecting section 9 selects a map to be displayed on the display 8, such as a satellite photograph map and a road map. For example, for a car navigation system, a selecting instruction is inputted for selection depending on whether the velocity has exceeded a threshold by a signal from a velocity sensor which determines the velocity of the vehicle or through the display instructor section 10.

With such an arrangement, when the map is displayed on the display 8 and scrolled in accordance with the instruction of the display instructor section 10, and when the display range goes out of the map data held in the first memory 4, the data read-out section 2 newly reads out map data from the data storage medium 1 and updates the map data stored in the first memory 4.

The display instructor section 10 provides instructions to display and scroll a map to the display control section 7 when a request to display the map of a certain point or area, an instruction to scroll the displayed map, or an instruction to let the displayed map follow the current location of the vehicle detected by a current location detector has been issued from the user with a pointing device, such as a joystick or a mouse, and when the map is scrolled by searching for a car travel route and simulating travel in accordance with the searched route.

The display control section 7 controls the display on the display 8 with the central coordinates of the screen and the coordinates of drawing-area data corresponding to each other, according to a display instruction and the scroll instruction. When the display area is out of the drawing area, the display control section 7 reads out map data on the off-area from the first memory 4 to the drawing section 5 for drawing, thereby updating the drawing memory 6.

However, when the display area is out of the map data held in the first memory 4, the display control section 7 requests the data read-out section 2 to update the map data, thereby reading out new map data from the data storage medium 1 through the data read-out section 2 and rewriting the first memory 4. At that time, when the map data read out from the data storage medium 1 is compressed map data, the data decompressing section 3 decompresses the compressed map data and writes the decompressed map data in the first memory 4. When the map data is uncompressed map data, the map data is directly written in the first memory 4.

The edit-information holding section 18 sets and holds edit information for editing the image of a satellite photograph to be displayed on the screen of the display 8, depending on the evening or night time zone, and the season of spring, summer, fall, and winter. The edit selecting section 19 selects the edit information held in the edit-information holding section 18, which senses change information on the environment and depending on the change information selects edit information for the time zone such as the evening or night time, the season, and the weather, such as rainy or cloudy weather.

General map data is so-called vector data composed of nodes and links, having drawing element information (identification information about roads, buildings, backgrounds, rivers, etc.). On the other hand, raster data is bit map data including pixel color information (lightness, hue, chroma, and the values of color-separated RGB), such as photograph data taken from a satellite or an airplane (photograph data taken from the sky) and its processed photograph data. The raster data is divided into blocks, and each of the divided raster data has representative coordinates.

Figure 2:
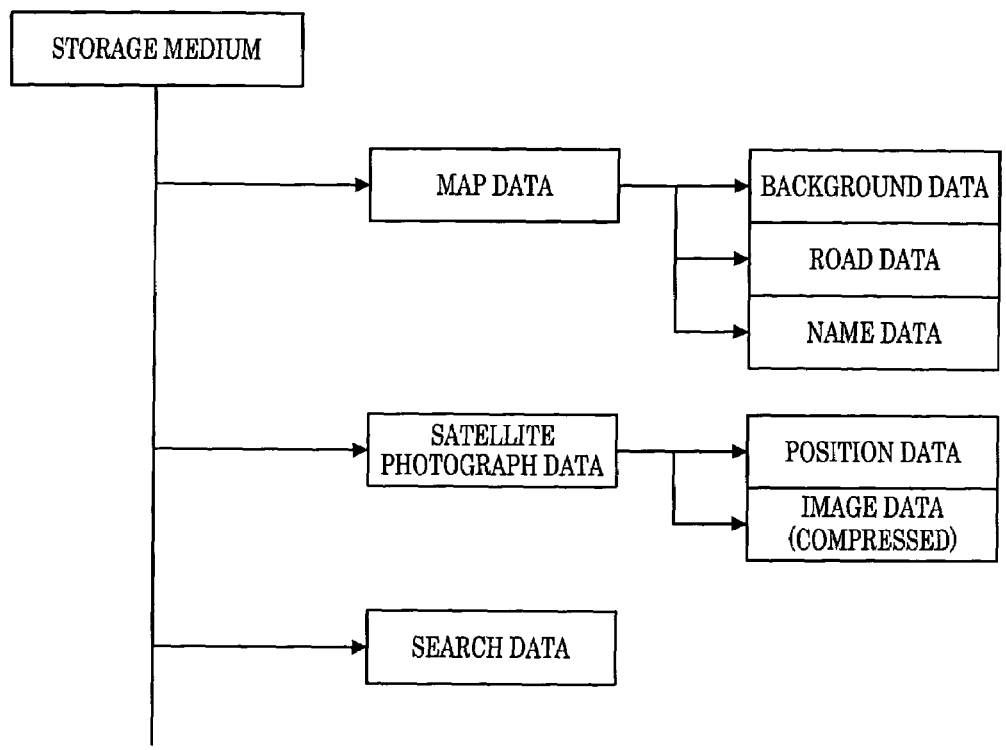
FIG. 2 is a block diagram of data stored in a map-data storage medium.

The data storage medium 1 stores, for example, uncompressed map data, satellite photograph data that is compressed map data, search data that is searched for under predetermined conditions, and route data including a route to a destination as shown in FIG. 2. Among them, the map data and the search data are uncompressed map data, the map data being principally constituted by a node-link map including background data, such as geographic features, houses, and facilities; road data formed of road link data; and name data, such as the names of roads, streets, facilities, and towns, which is a vector data having position coordinates.

Figure 3:
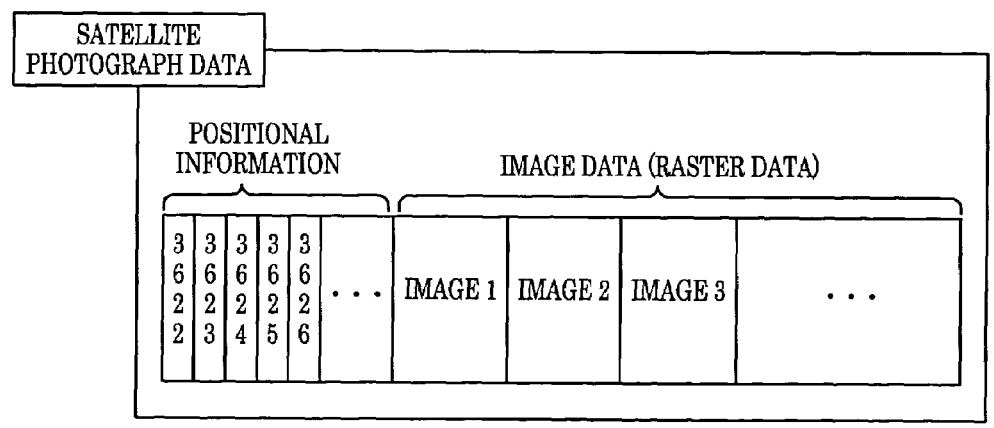
FIG. 3 is a schematic diagram of satellite photograph data.

The satellite photograph data includes position data and image data, as shown in FIG. 3. The image data is high-compressibility raster data, which is formed by compressing raw satellite photograph data by JPEG, such as bit map data. For the raster data, because each of the roads and facilities has no position coordinates, image data is divided into blocks, such as image 1, image 2, and image 3, and positional information corresponding to each image data serves as position data. The positional information of each block may be the coordinates of the center or the left lower corner of an image, the latitude and longitude information, or alternatively, information in which the latitude and longitude information is converted to a code. The sizes of images 1, 2, and 3 are basic information common to the images 1, 2, and 3 together with the kind of compression and the compression ratio.

General map display control applied to a navigation system will be described. In a method of reading data around the current location when image data of each block is stored with positional information converted to a code, the coordinates of a drawing area is determined on the basis of the current location and the scale, and raster data contained in the drawing area is then determined on the basis of the positional information that is obtained from the coordinates of the area and the code of raster data.

At a normal vehicle speed, satellite photograph data is read out from the data storage medium 1 and is decompressed, and the raster data is stored in the first memory 4, so that a map is displayed on the basis of the satellite photograph data, on which the current location is displayed.

When a vehicle speed exceeds a threshold (for example, 80 km/h), the raster data in the first memory 4 is erased, and uncompressed map data is read out from the data storage medium 1, is held in the first memory 4, and is drawn in the drawing memory 6, so that the current location is displayed on the vector map data.

Also when the current location is on an expressway, the raster data in the first memory 4 is erased, and uncompressed map data is read out from the data storage medium 1, is held in the first memory 4, and is drawn in the drawing memory 6, so that the current location is displayed on the vector map data.

As described above, the satellite photograph data is raster compressed data with high compressibility, thus taking a lot of time for decompression. Accordingly, the satellite photograph data is converted to vector uncompressed map data, thereby preventing the map drawing from being late during high-speed traveling.

Figure 4:
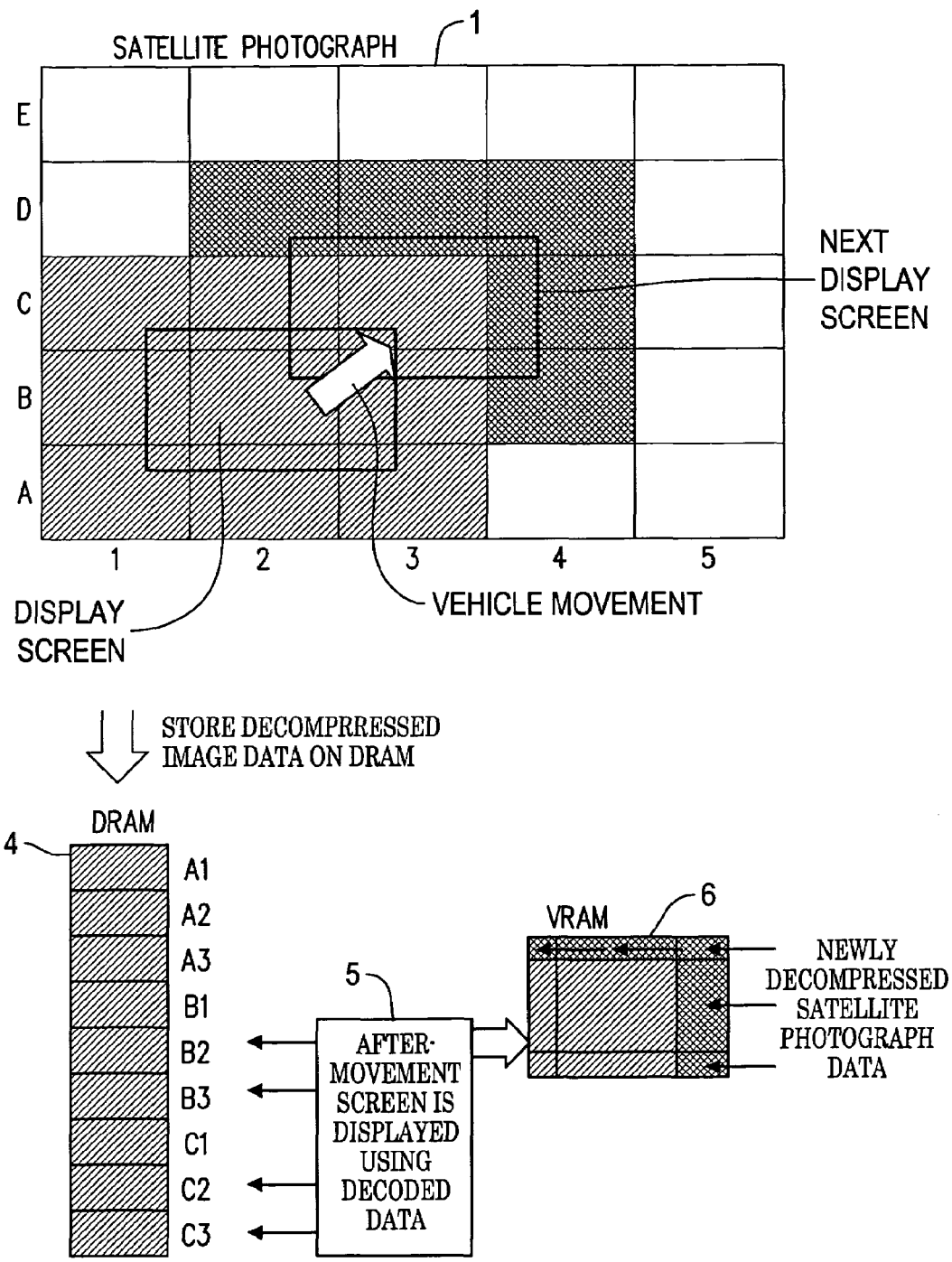
FIG. 4 is a diagram showing the relationship among satellite photograph data on a data storage medium, satellite photograph data to be decompressed on a first memory, and a display screen.
Figure 5:
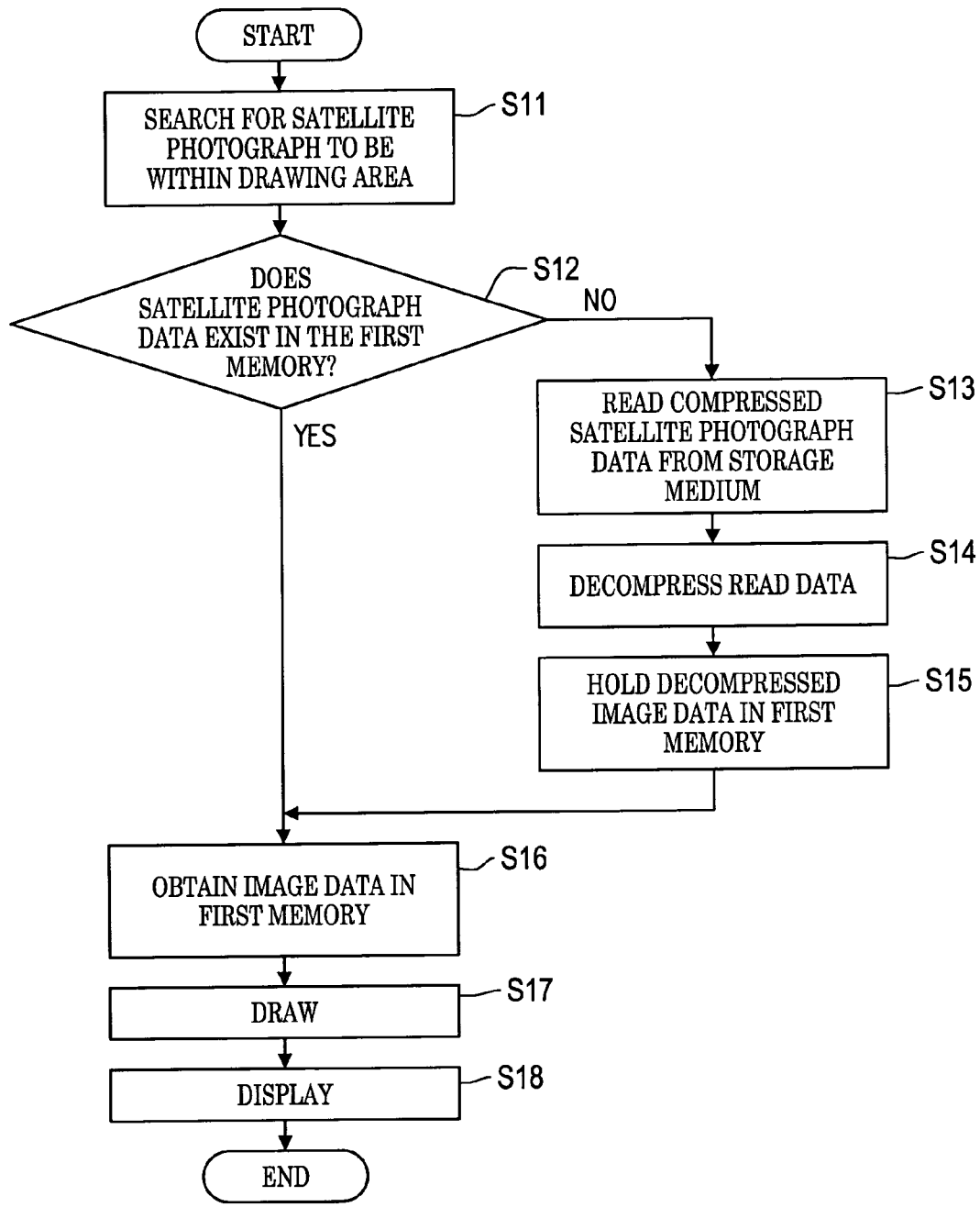
FIG. 5 is a flowchart for display processing.
Figure 6:
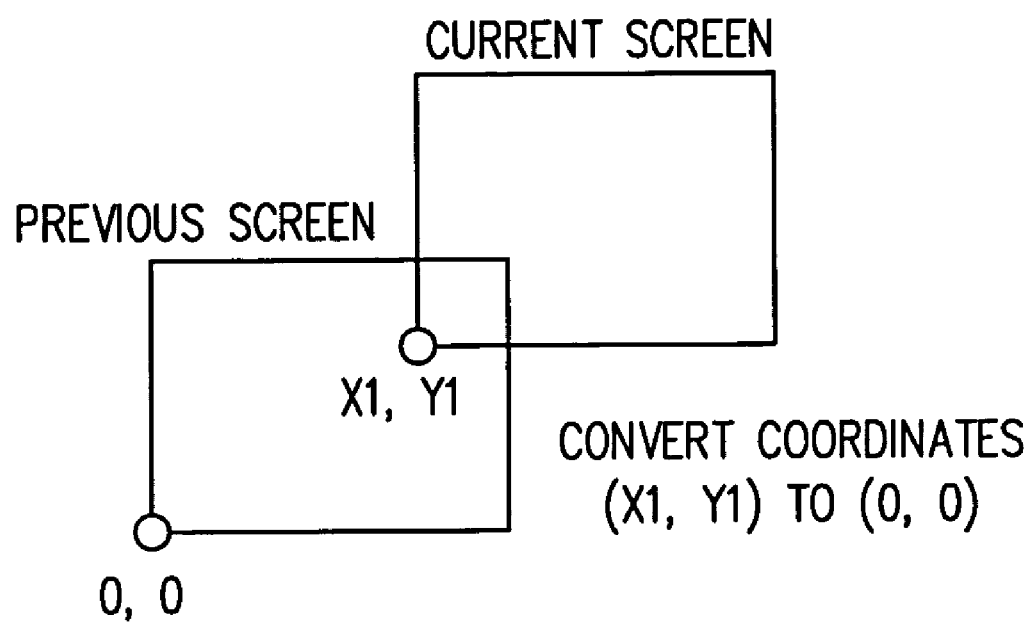
FIG. 6 is an explanatory diagram of coordinate conversion processing by scrolling a display screen.

The decompress process and the drawing process for the satellite photograph data during scrolling will be described. FIG. 4 is a diagram showing the relationship among satellite photograph data on a data storage medium, satellite photograph data to be decompressed on a first memory, and a display screen; FIG. 5 is a flowchart for display processing; and FIG. 6 is an explanatory diagram of coordinate conversion processing by scrolling a display screen.

Referring to FIG. 4, the satellite photograph data stored in the data storage medium 1 is divided into blocks A1 to A5, B1 to B5, . . . , E1 to E5. In the satellite photograph data, when a display screen a is set across the blocks A1 to A3, B1 to B3, and C1 to C3 substantially with the center in the block B2, at least the images of the blocks A1 to A3, B1 to B3, and C1 to C3 are read out from the data storage medium 1, and the decompressed image data is stored in the first memory 4 (for example, DRAM).

When a vehicle moves in the direction from the current display screen a to the next display screen b, the images of the blocks B2, B3, C2, and C3 held in the first memory 4 are unchangedly displayed on the moved screen, and new images of the blocks B4, C4, and D2 to D4 need to be decompressed from the satellite photograph data and to be stored in the first memory 4 for display.

The flow of the display process will be described. Referring to FIG. 5, first, satellite photograph data to be within a drawing area is searched for (step S11), and it is determined whether relevant satellite photograph data exists in the first memory 4 (step S12). When the satellite photograph data does not exist in the first memory 4, compressed satellite photograph data is read out from the data storage medium 1 (step S13); the read-out satellite photograph data is decompressed (step S14); and the decompressed image data is stored in the first memory 4 (step S15).

When it is determined that the image data exists in the first memory 4, the image data in the first memory 4 is obtained (step S16); the image data is drawn in the drawing memory 6 (step S17); and data on the display area is read out from the drawing area and is displayed on the display 8 as an image of the satellite photograph (step S18).

When compressed data for the next display screen is read out from the data storage medium 1, the data is erased in early order and new data is stored in the first memory 4. Specifically, information unique to the map data of a block (such as positional information and information about stored location on the data storage medium 1), which is read out and drawn earlier than the map data of each block to be stored in the first memory 4, and information unique to the map data of a block which is read out later are stored in the first memory 4. Thus, it is determined which map data is older by consulting the unique information.

Referring again to FIG. 4, the current location or the cursor sometimes returns to the area that is once displayed, as from the display screen a through the next screen b again to the first display screen a. By the method of erasing the map data of the blocks A1 and A2, when the screen moves from the next screen b to the first screen a, the blocks A1 and A2 are again read out from the data storage medium 1, so that it takes a lot of time for processing. On the other hand, giving low erasing priority to the map data of the blocks A1 and A2 as new map data to prevent it from being erased allows quick display processing without requiring time for repeated reading and decompress processing as the map data is held in the first memory 4 even if the display screen is moved as described above.

When a route is displayed on the image of the satellite photograph which is displayed in this way, among roads of vector data, only a route is overwritten on the drawing memory 6 in which satellite photograph data is drawn. Also when the current location is displayed, a current location mark is overwritten on the drawing memory 6.

The criteria for drawing are determined depending on the current location, the center of the screen, the user-operated cursor position, etc. In the drawing process, referring to FIG. 6, letting (0, 0) be the coordinates of the left lower corner of the drawing area, the coordinates of a previous screen shift to the left lower corner of the drawing area of the current screen, the coordinates are converted so that the coordinates (X1, Y1) of the left lower corner of the drawing area of the current screen becomes (0, 0).

The invention is not limited to the above embodiment, various modifications may be made. For example, according to the embodiment, raster data such as satellite photograph data is stored in the data storage medium 1 as compressed data. However, it is also possible to structure the system such that vector data or raster data of areas that may be used with less frequency is compressed, and vector data or raster data of areas that may be used with high frequency is not compressed in the data storage medium 1. The area that may be frequently used may include a high-density population area, an area having a highway, and an area having specific facilities and/or major facilities.

Particularly for raster data, it is difficult in actuality to store all uncompressed map data in a data storage medium because it has limited storage capacity; on the other hand, storing all the map data with compression requires decompression every time; thus it takes a lot of time for display. Accordingly, storing the map data of areas that is assumed to be used with high frequency in the data storage medium without compression decreases display processing and the time for display.

The embodiment in which vector data is stored without compression and raster data is stored with compression has been described; however, the vector data may be compressed as with the raster data.

When a determination is made whether display-area data exists in the first memory 4, it is determined, depending on whether the display-area data exists in the drawing memory 6, as follows. When drawn map data to be within a new display area exists in the drawing memory 6, the coordinates of the map data are converted to those of a new screen. When no drawn map data to be within a new display area exists in the drawing memory 6, it is determined whether the data exists in the first memory 4, wherein when the data exists, it is read out from the first memory 4 and is drawn in the drawing memory 6. When no data exists in the first memory 4, compressed map data is read out from the data storage medium 1 and is decompressed. The decompressed image data is stored in the first memory 4, and the decompressed image data is read out from the first memory 4 and is drawn in the drawing memory 6. Display-area data is then read out from the drawing memory 6 and displayed on the display 8.

It is also possible to employ a map display unit which receives the program of the embodiment or, alternatively, a map display unit which uses a storage medium (IC card) having the program of the embodiment loaded by a personal computer (PC). In such cases, the map display unit includes a communicating section for transmitting and receiving data to/from an external information center, receiving a program for achieving the functions of the embodiment (refer to the flowchart in FIG. 5 and other embodiments) from the information center, and storing it in a storage medium, such as a hard disk and a flash memory. Thus, the received program is driven to realize the embodiment. Alternatively, a program sent from the information center is downloaded in a storage medium (IC card) that is detachable from a home PC. Thus, the embodiment can be achieved by the program driven when the storage medium is inserted into the map display unit.

Figures 7A, 7B, 7C:
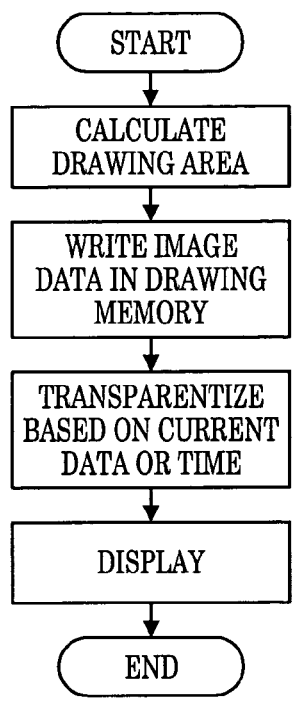
FIGS. 7(A) to 7(C) are diagrams for explaining examples of drawing and display processing.
Figure 9:
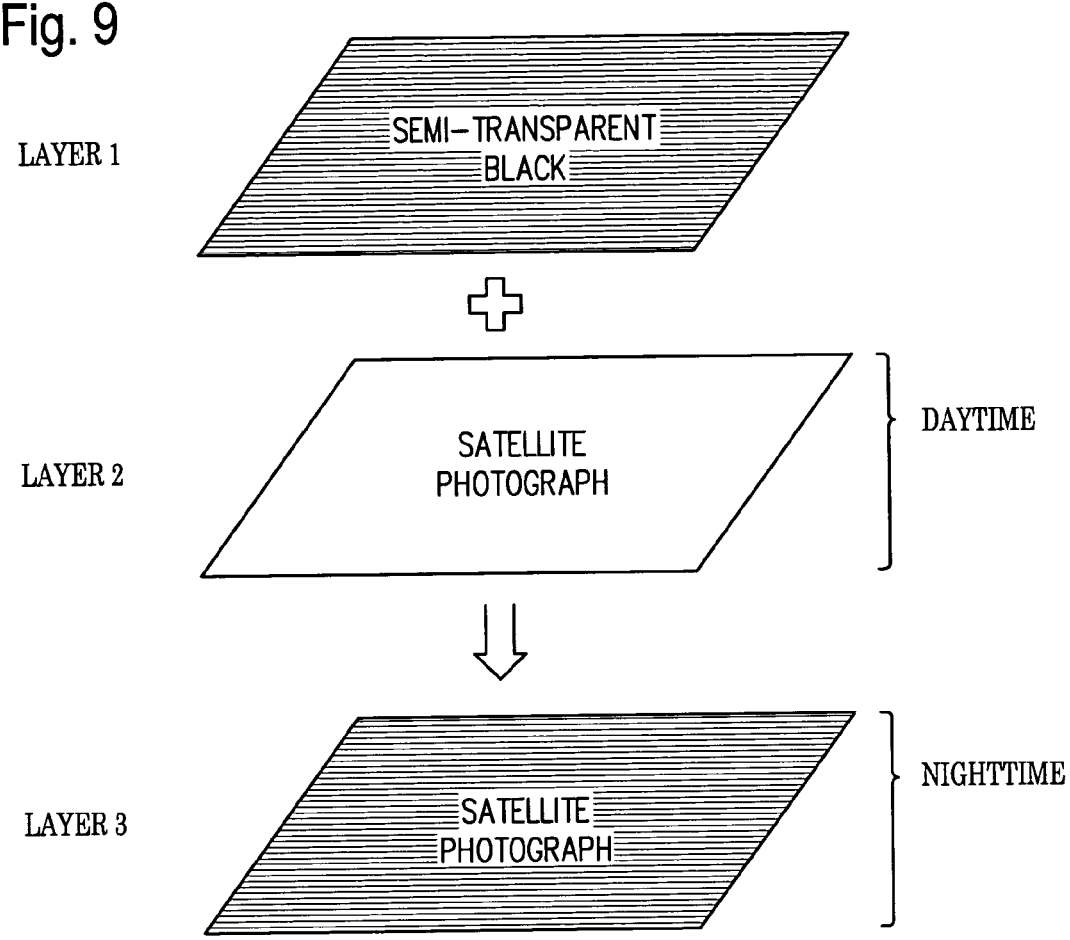
FIG. 9 is an explanatory diagram of another example of the process of converting a day-image satellite photograph to a night image.
Figure 10:
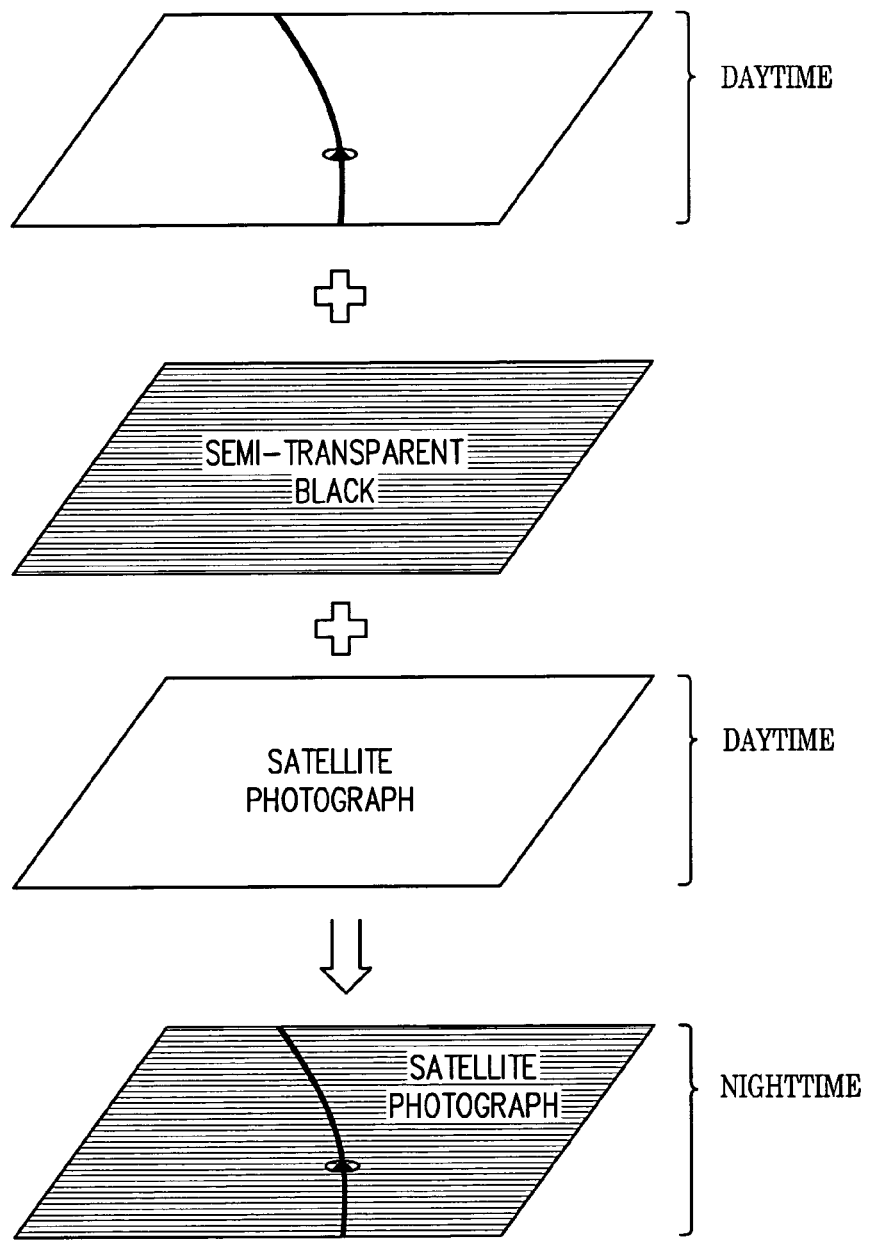
FIG. 10 is an explanatory diagram of an example of the process of displaying a mark and a route on a satellite photograph.

For the raster data, it is also possible to provide an easily viewable display responding to any difference in the environment using only one image data by editing various display images. Specific example of the process will be described hereinafter. FIGS. 7(A) to 7(C) are diagrams for explaining examples of drawing and display processing; FIG. 8 is an explanatory diagram of an example of the process of converting a day-image satellite photograph to a night image; FIG. 9 is an explanatory diagram of another example of the process of converting a day-image satellite photograph to a night image; and FIG. 10 is an explanatory diagram of an example of the process of displaying a mark and a route on a satellite photograph.

Edit information to be held in the edit-information holding section 18 is as follows. In the case of edit information for editing for the seasons, semi-transparent colors, such as flower-image pink for spring, sky-image blue for summer, autumn-color image yellow for fall, and snow-image white for winter are set, as in the table of FIG. 7(B), which are selected depending on the date and are blended to draw the image of a satellite photograph, and the color (tint) of the satellite photograph is thereby changed. In the case of edit information for editing for the time zone, semi-transparent colors, such as sunset-image red for evening, and dark-image black (in actuality, a "gray tint" to be semi-transparent) for night are set, as in the table of FIG. 7C, which are selected depending on the time zone and are blended to draw the image of a satellite photograph, and the color of the satellite photograph is thereby changed.

In such a case, the edit information may be read out depending on the data and time to vary the semi-transparent color between spring evening and spring night and between spring evening and summer evening. Also, in addition to the environmental changes with a time of noon, evening, and night and the environmental changes associated with the seasons of spring, summer, fall, and winter, the color may be varied with the weather of clear, cloudy, and rainy. The weather information may be received from the information center; thus, the transparentizing process may be performed with semi-transparent colors responding to the received weather information. The determinations on the time zone and the seasons are made by receiving global positioning system (GPS) information.

The procedure is as follows. Referring to FIG. 7(A), a drawing area is first calculated (step S22), and image data on the drawing area is read out from the first memory 4 and is written to the drawing memory 6 (step S23). Edit information is read out from the table on the basis of the current data or time, is subjected to transparentizing process (step S24), and is displayed on the display 8.

When a daytime-image satellite photograph is changed to a night image photograph, as in the above, one method (FIG. 8) is to blend semi-transparent night color (black) (A) onto the image of a daytime-image satellite photograph (B) by combining the data to create a single night image satellite photograph (C). Referring to FIG. 9, another method is to overlay a semi-transparent layer 1 (A) in semi-transparent black on a layer 2 (B) having an image of a satellite photograph so that the displayed satellite photograph of the layer 2 is viewed through the overlaid semi-transparent layer 1 to appear as a night image (C). Furthermore, referring to FIG. 10, when a vehicle mark (a bit mapped current location mark) and a searched route (vector-data guide route) (A) are overlaid on a satellite photograph (C), the vehicle mark and the route (A) are overwritten on the satellite photograph (C) and semitransparent black map data (B) after transparentizing process.

Figure 11:
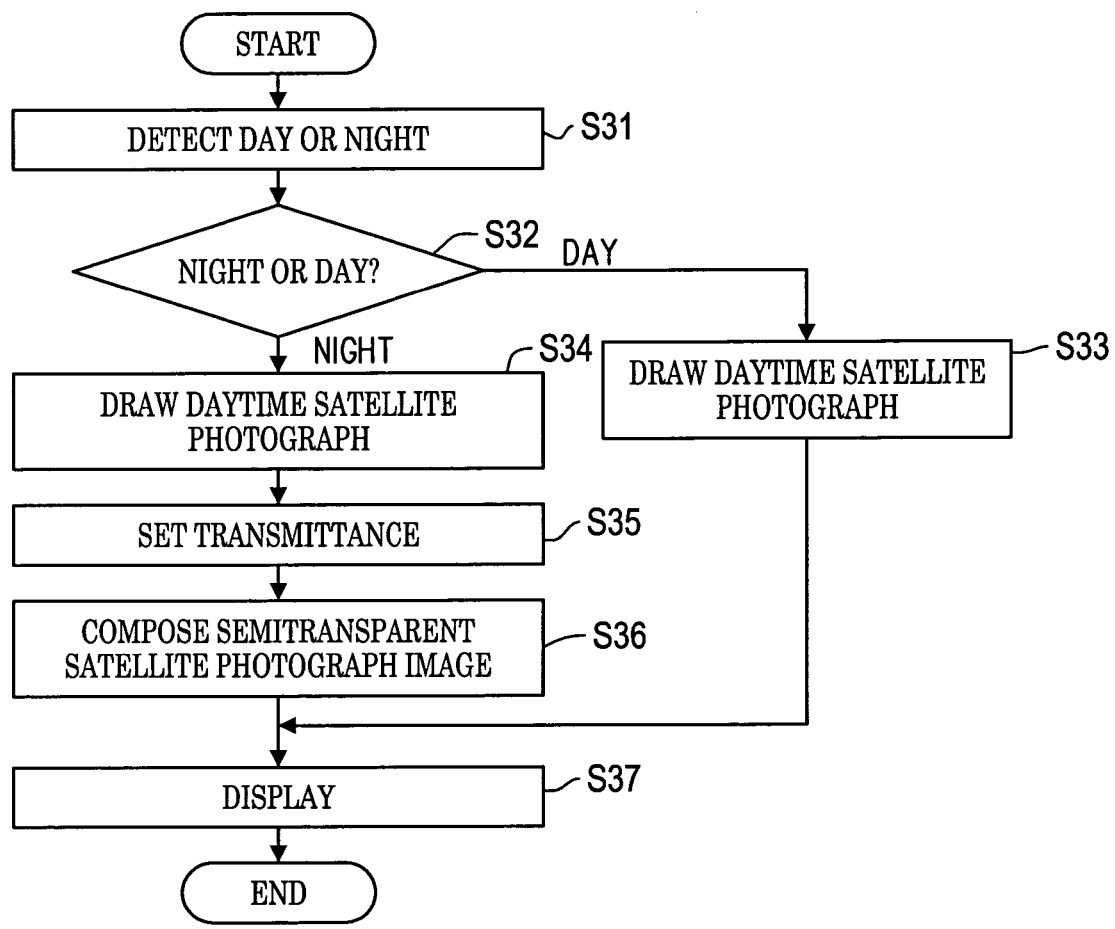
FIG. 11 is a flowchart of a process for switching a display by using one layer.
Figure 12:
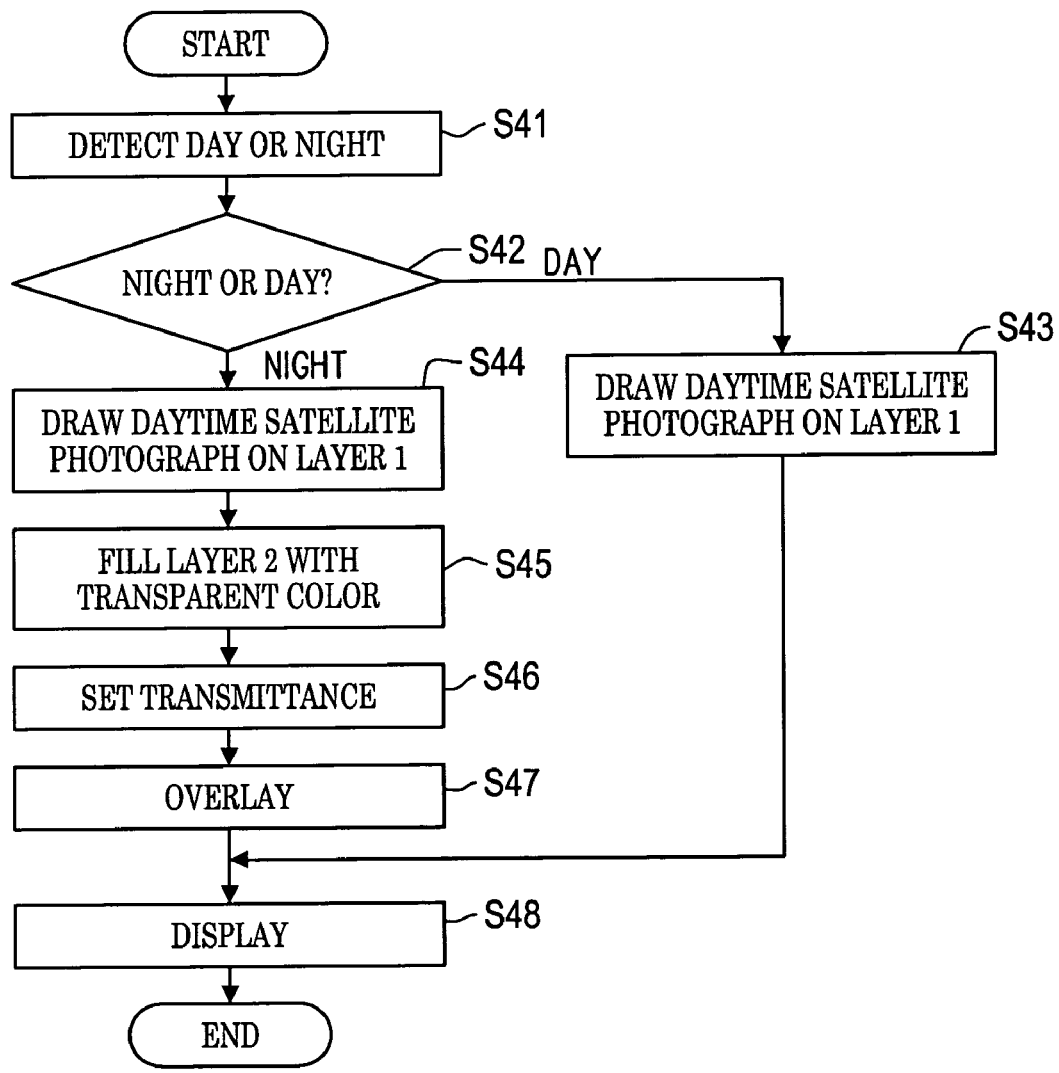
FIG. 12 is a flowchart of a process for switching a display by using two layers.
Figure 13:
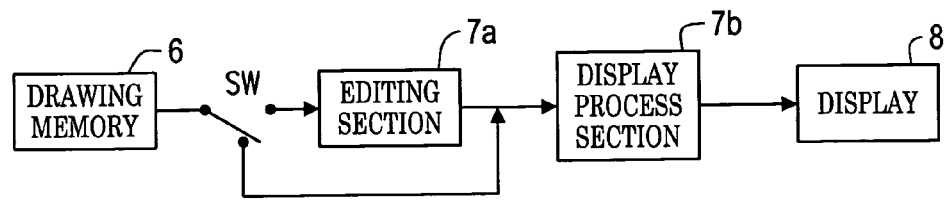
FIG. 13 is a block diagram of a circuit for editing.
Figure 14:
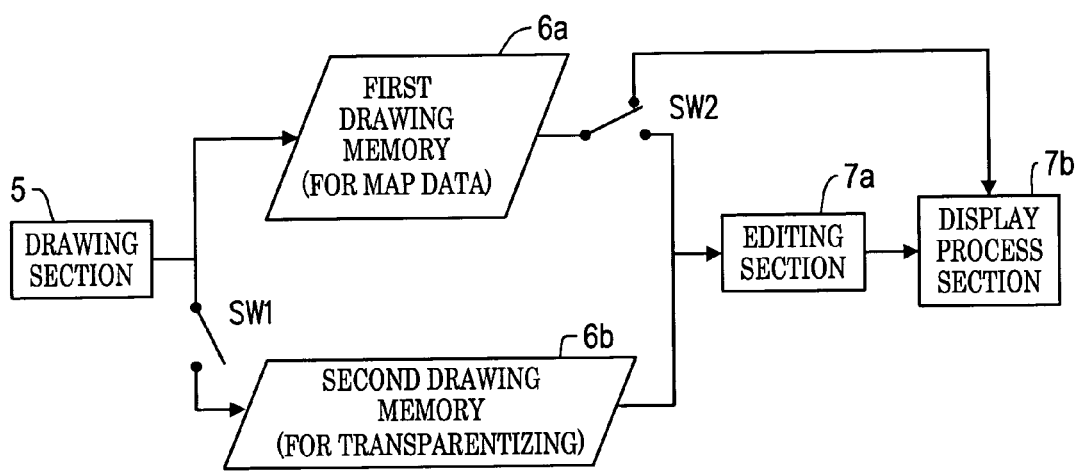
FIG. 14 is a block diagram of another circuit for performing editing.

FIG. 11 is a flowchart of a process for switching a display by using one layer;

FIG. 12 is a flowchart of a process for switching a display by using two layers; FIG. 13 is a block diagram of a circuit for editing; and FIG. 14 is a block diagram of another circuit for editing. In the drawings, reference numeral 5 denotes the drawing section; numerals 6, 6a, and 6b denote drawing memories; numeral 7a denotes an editing section; numeral 7b denotes the display process section; and numeral 8 denotes the display.

The procedure of the display process shown in FIG. 8, using one layer, is as follows. For example, referring to FIG. 11, it is first determined whether the time is day or night by sensing time on the basis of a watch or GPS data, determining lightness, or checking the operational conditions of the vehicle, such as the operation of a switch and a light during night traveling (step S31). It is determined whether the time is day or night (step S32). When it has been determined to be daytime, a daytime satellite photograph is drawn in the drawing memory 6 (step S33) and is displayed on the display 8 (step S37). Describing it with the circuit of FIG. 13, the data in the drawing memory 6 bypasses the editing section 7a by means of a switch SW and is displayed on the display 8 through the display process section 7b.

When it is determined to be night, a daytime satellite photograph is drawn in the drawing memory 6 (step S34), transmittance is set (step S35), a semi-transparent satellite photograph image is formed (step S36), and is displayed on the display 8 (step S37). Describing it with the circuit of FIG. 13, the data in the drawing memory 6 is edited at a transmittance set by the editing section 7a, with the switch SW turned on, into a semi-transparent image and is displayed on the display 8 through the display process section 7b.

The procedure of the display process shown in FIG. 9, using two layers, is as follows. For example, referring to FIG. 12, it is first determined whether the time is day or night by determining time and date information on the basis of a watch, GPS data, or a watch corrected by GPS, determining lightness, or checking the operational conditions of the vehicle, such as the operations of a switch (ILM switch) and a light during night traveling (step S41). It is determined whether the time is day or night (step S42). When it has been determined to be daytime, a daytime satellite photograph is drawn on the layer 1 in the drawing memory 6 (step S43) and is displayed on the display 8 (step S48). Describing it with the circuit of FIG. 14, the data from the drawing section 5 is drawn in the first drawing memory 6a in the image of a satellite photograph, bypasses the editing section 7a by means of a switch SW2 and is displayed on the display 8 through the display process section 7b.

On the other hand, when it has been determined to be night, a daytime satellite photograph is drawn on the layer 1 in the drawing memory 6b (step S44), and is overlaid in a semi-transparent color on the layer 2 (step S45); transmittance is set (step S46); the layer 1 and the layer 2 are overlaid on one another (step S47); and the overlay is displayed on the display 8 (step S48). Describing it with the circuit of FIG. 14, with both the switches SW1 and SW2 turned on, the data from the drawing section 5 is drawn in the image of a satellite photograph in the first drawing memory 6a, and the image in the second drawing memory 6b is filled with the semi-transparent color. They are overlaid on one another at a transmittance set by the editing section 7a and displayed on the display 8.

Specific methods of changing a color tone by blend drawing will be described. Let $R_P$, $G_P$, and $B_P$ be the respective edit information of three primary colors, red (R), green (G), and blue (B), which is to be added as night black and summer blue; $R_1$, $G_1$, and $B_1$, be the map data of a satellite photograph in pixel units; K be the transmittance; and A ($R_A$, $G_A$, and $B_A$) be a fixed value that is determined depending on the data and time zone.

One method is to add a value obtained by multiplying transmission-color information by transmittance and a value obtained by multiplying color information of map data by (1−transmittance), which can be expressed as the following equation:

RGB value (R, G, B) of a transmitted pixel=K×($R_P$, $G_P$, $B_P$)+(1−K)×($R_1$, $G_1$, $B_1$).

Another method is to add a value obtained by multiplying transmission-color information by transmittance and the color information of map data, which can be expressed as the following equation:

RGB value (R, G, B) of a transmitted pixel=K×($R_P$, $G_P$, $B_P$)+($R_1$, $G_1$, $B_1$).

Still another method is to subtract a fixed value from the color information of map data, which can be expressed as the following equation:

RGB value (R, G, B) of a transmitted pixel=($R_1$, $G_1$, $B_1$)−A.

Because general map data is so-called vector data composed of nodes and links, and has drawing element information (identification information on roads, buildings, backgrounds, rivers, etc.), individual color can be freely changed by identifying and selecting each drawing element. On the other hand, raster data is bit map data including color information for each pixel (lightness, hue, chroma, and the values of color-separated RGB), such as photograph data taken from a satellite or an airplane (satellite photograph data, etc.) and its processed data. The raster data is divided into blocks, and each of the divided raster data has representative coordinates. Accordingly, roads, buildings, backgrounds, rivers, etc. cannot be identified with such raster data; thus, the embodiment in which a color tone is changed by uniform transparentizing process without selecting a drawing element is particularly useful for controlling the display of a raster data map.

The satellite photograph data only includes information in which positional information of each block is changed to latitude and longitude information, or information in which the latitude and longitude information is converted to a code. In order to read the data around the current location when the map data of each block is stored with the positional information changed to a code, a drawing area is determined on the basis of the current location, the coordinates of the drawing area are determined, and raster data corresponding to the drawing area is determined from the coordinates of the area and the positional information obtained from the code of the raster data.

According to the embodiment, as described above, semi-transparent color, transmittance, and composition ratio are set or selected, so that the semi-transparent color of the image of satellite photograph data is calculated or composed with the set or selected semitransparent color, transmittance, and composition ratio and a semi-transparent image is produced. Therefore, an easily viewable and familiar display without a noticeable difference can be provided in response to the difference in environment, such as evening and night, spring, summer, fall, and winter, and rainy or cloudy weather using only one piece of massive satellite photograph data. Thus, a user-friendly map display is realized. Also, a current location mark, a route, and a user-operating icon image are simply overwritten on the composite image. Thus, even when a semi-transparent screen is produced from edit information responding to various environmental differences, an operating icon image with high viewability can be overlaid on a map.

Figure 15:
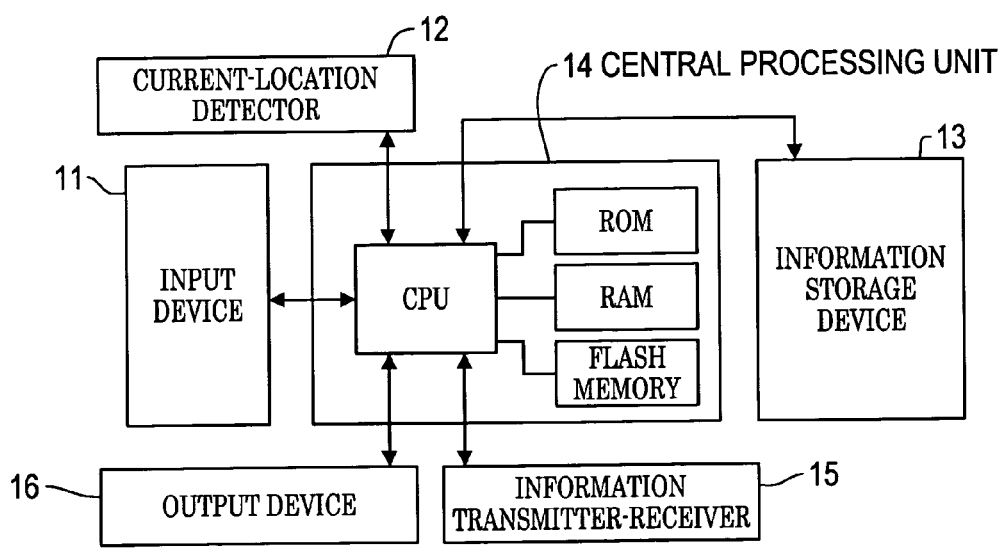
FIG. 15 is a block diagram of a car navigation system incorporating the map display unit according to the invention.

FIG. 15 is a block diagram of a car navigation system incorporating the map display unit according to the embodiment of the invention, which includes an input device 11 for inputting information on route guidance; a current-location detector 12 for detecting information on the current location of the vehicle; an information storage device 13 in which navigation data necessary for calculating a route, such as satellite photograph data and road map data, display guidance data necessary for guidance, and a navigation program are stored; a central processing unit 14 for performing a display guidance process necessary for a route searching process and route guidance and for controlling the entire system; an information transmitter-receiver 15 for transmitting and receiving data to/from an information source, such as an information center that stores data necessary for navigation and provides it through a communication line at an operator's request and an electronic databook that stores map data and data specific to the operator, such as destination data; and an output device 16 for outputting information on route guidance. The arrangement of each component will be described hereinafter.

The input device 11 has a function of instructing the central processing unit 14 to perform navigation by order from the operator so that the operator can input destination and output voice/screen guide information as necessary, and includes a touch switch or an operation switch for inputting the destination with a telephone number or the coordinates on a map and requesting route guidance as means for performing the function. Of course, the means may be an input device, such as a remote control. Also, it is possible to add a voice recognition device for voice input and a record-card reader for reading data recorded in an IC card or an electromagnetic card.

The information transmitter-receiver 15 includes a vehicle information and communication system (VICS) receiver and a data transmitter-receiver as means for obtaining traffic information. The VICS transmits real-time traffic information to vehicles by FM multiplex broadcasting (teletext broadcasting), a radio beacon, or a light beacon. The FM multiplex broadcasting transmits rough information over a wide area. On the other hand, the radio beacon and the light beacon provide detailed information about a narrow area of about 10 km radius around the beacon, which can be received when a vehicle passes through the area of the beacon. The VICS transmission data includes the degree of traffic congestion (such as impassability, heavy traffic, middle traffic, light traffic, and normal traffic), the head of congestion, the length of congestion, traffic regulation (construction information, closed traffic, etc.), and travel time (time required at a prescribed speed) for a link number of each road. The data transmitter-receiver is, for example, a cellular telephone or a personal computer, for transmitting and receiving information necessary for navigation to/from a traffic information center (such as an advanced traffic information service: ATIS) at the request from an operator.

The output device 16 has functions of outputting voice/screen guidance information and print-outputting data processed by the central processing unit 14 when required by the operator, and includes a display for displaying the input data and automatically displaying route guidance at the operator's request on the screen; a printer for printing the data processed by the central processing unit 14 and the data stored in the information storage device 13; and a speaker for outputting voice route guidance.

The display 8 includes a color cathode ray tube (CRT) or a color liquid crystal display (LCD) acting as the screen of the map display unit of the embodiment. The display 8 displays in color all of a satellite photograph image plane, a route setting plane, a zone plane, an intersection plane necessary for navigation based on the map data and the guidance data processed by the central processing unit 14, on which a button for setting the route guidance, switching the guidance plane during the route guidance is displayed. Particularly, passing intersection information, such as the name of a passing intersection, is viewed as a popup in color on the zone plane. The display is arranged, for example, in an instrumental panel near a driver's seat, so that the driver, or operator, can know the current location and obtain the information on the forward route on the zone plane.

The current-location detector 12 detects information on vehicle's current location, and has an absolute direction sensor including a magnetic field sensor, a steering sensor, a relative direction sensor including a gyrocompass, a distance sensor for determining travel distance from the number of wheel rotations, and a GPS receiver using the GPS. Information on time and date and its correction information can be obtained with the GPS receiver.

The information storage device 13 is an external storage device that stores a navigation program and data, which is a recording medium, such as a CD-ROM. The program includes an application section having a map drawing section, a route searching section, a route guidance section, a current-location calculating section, and a destination-setting-operation control section and outputting navigation signals; and an operating system, etc, which stores a program for route searching; programs for display output control necessary for route guidance and for voice output control necessary for voice guidance; data necessary therefor; and display information necessary for route guidance and map display. The data includes raster satellite photograph data; vector map data (a road map, a house map, a building feature map, etc.) necessary for route guidance, intersection data, node data, road data, photograph data, registered point data, destination data, guide road data, detailed destination data, destination-read data, telephone-number data, address data, and other data files, thus having all data necessary for navigation systems.

The central processing unit 14 includes a CPU for performing various operations; a flash memory (such as an electrically erasable and programmable read-only memory, EEPROM) that is a rewritable nonvolatile ROM for storing important information (such as data for setting programs and conditions for route searching and route guidance and various parameter data); a nonvolatile ROM that stores a program (program reading means) for checking the program of the flash memory and for performing update processing; and a readable-writable volatile RAM (such as a static random access memory, SRAM, in which temporarily stored information can be electrically held) for temporarily (in a volatile manner) storing a memory point in which an arbitrary-point information registered by the operator, frequency information accumulated by a learning function, and individually stored information, such as error correction information of various detectors. The central processing unit 14 further includes an image memory in which image data to be used for display is stored; an image processor for extracting image data from the image memory in accordance with a display-output control signal from the CPU, applying image processing, and outputting it to the display; and a voice processor for combining a voice, a phrase, a sentence, a sound, etc. that are read out from the information storage device 13 and converting it to an analog signal under a voice-output control signal, thereby outputting it a speaker.

It is possible to provide a system in which the navigation program and data is read out from the exterior through the information transmitter-receiver 15, or alternatively, a system of a combination of a vehicle map display unit, a vehicle-mounted navigation unit, and an information center. In this way, necessary navigation program and data are read out from the exterior through the information transmitter-receiver 15, so that a necessary program and data can be updated using a recording medium, such as a DVD, in place of a CD-ROM, as the information storage device 13, and also, they can be directly stored in the flash memory or the RAM of the central processing unit 14 without the information storage device 13.

Here the operation will be described. In navigation using the above arrangement, when the program of the route guidance system is driven by the CPU of the central processing unit 14, the current-location detector 12 first detects the current location, displays a map around the current location, and then sets a destination by means of at least one of a telephone number, an address, a facility name, a memory point, etc. Subsequently, the route from the current location to the destination is searched. When the route has been determined, route guidance and display are repeatedly performed until reaching the destination while the current location is searched for by the current-location detector 12. The display screen of the embodiment is subjected to a transparentizing process depending on the environment, such as the time zone, the season, the driving situation, and the weather, when the satellite photograph is displayed.

The edit of the satellite photograph is not limited to the above description and various modifications may be made. The invention has been described with respect to an arrangement in which a drawing memory in which satellite photograph data is drawn is subjected to a transparentizing process. However, when the satellite photograph data is drawn in the drawing memory, each pixel of the satellite photograph data is calculated for a transparentizing process; the satellite photograph data may be combined with semi-transparent image data; or alternatively, the satellite photograph data may be subjected to logical processing with operating icon images, such as a current location mark and a route for overwriting, and then the composed data (edited data) may be drawn in the drawing memory. In other words, the edit process may be performed with a drawing processor.

Accordingly, varying the color tone of raster map data depending on environment allows an easily viewable map to be displayed in a short time. Although specific colors have been used in the description, the use of alternative colors is possible, so long as they are semi-transparent, to convey the desired information. Such use of alternative colors falls within the scope of the invention.

According to the invention, map scroll operation can be smoothly performed using compressed map data without a delay in the display.

What is claimed is:

1. A map display unit including a first memory for storing map data and a drawing memory for drawing the map data and displaying display-area data of a drawing area in the drawing memory on a display, comprising:
    data-reading means for selectively reading compressed map data and uncompressed map data from a data storage medium;
    data-decompressing means for decompressing the compressed map data read out by the data-reading means and storing the decompressed map data in the first memory;
    drawing means for drawing either of the uncompressed map data read out by the data-reading means or the map data stored in the first memory in the drawing memory;
    display-control means for determining the display area and displaying the display-area data of the drawing area in the drawing memory on the display; and
    map-selecting means for selecting a map to be displayed, wherein the map-selecting means switches which of the uncompressed map data or the map data the drawing means draws in the drawing memory;
    wherein the map-selecting means includes means for determining the velocity of a vehicle and switches the map to be displayed depending on whether the velocity has exceeded a threshold.

2. The map display unit according to claim 1, wherein the compressed map data is raster data and the uncompressed map data is vector data.

3. The map display unit according to claim 2, wherein the raster data is satellite photograph data.

4. The map display unit of claim 1, further comprising the data storage medium.

5. A map display method including a first memory for storing map data and a drawing memory for drawing the map data and displaying display-area data of a drawing area in the drawing memory on a display, comprising:
    selectively reading compressed map data and uncompressed map data from a data storage medium;
    decompressing the compressed map data read out by the data-reading means and storing the decompressed map data in a first memory;
    drawing either of the uncompressed map data read out by the data-reading means or the map data stored in the first memory in a drawing memory;
    determining the display area and displaying the display-area data of the drawing area in the drawing memory on the display;
    selecting a map to be displayed;
    switching which of the uncompressed map data or the map data the drawing means draws in the drawing memory;
    determining the velocity of a vehicle; and
    switching the map to be displayed depending on whether the velocity has exceeded a threshold.

* * * * *